(12) United States Patent
Cui et al.

(10) Patent No.: US 9,087,378 B2
(45) Date of Patent: Jul. 21, 2015

(54) SCALE CHANGING DETECTION AND SCALING RATIO DETERMINATION BY USING MOTION INFORMATION

(75) Inventors: Chunhui Cui, Hong Kong (HK); Chun-Fu Chen, Tainan (TW); Ciao-Siang Siao, Tainan (TW); Gwo Giun Lee, Tainan (TW); Yan Huo, Shenzhen (CN)

(73) Assignee: Hong Kong Applied Science and Technology Research Institute Company Limited, Shatin, New Territories (HK)

( * ) Notice: Subject to any disclaimer, the term of this patent is extended or adjusted under 35 U.S.C. 154(b) by 536 days.

(21) Appl. No.: 13/537,086

(22) Filed: Jun. 29, 2012

(65) Prior Publication Data

US 2014/0003741 A1    Jan. 2, 2014

(51) Int. Cl.
G06T 7/00 (2006.01)
G06K 9/50 (2006.01)
G06K 9/32 (2006.01)

(52) U.S. Cl.
CPC .............. *G06T 7/0024* (2013.01); *G06K 9/50* (2013.01); *G06K 2009/3291* (2013.01); *G06T 2207/10016* (2013.01); *G06T 2207/30236* (2013.01)

(58) Field of Classification Search
USPC ................ 382/103, 236; 375/240.01–240.29
See application file for complete search history.

(56) References Cited

U.S. PATENT DOCUMENTS

| | | | |
|---|---|---|---|
| 6,115,067 A | 9/2000 | Koyama | |
| 6,549,683 B1 | 4/2003 | Bergeron et al. | |
| 8,498,444 B2 * | 7/2013 | Sharma | 382/103 |
| 2003/0122853 A1 | 7/2003 | Kim | |
| 2006/0078197 A1 * | 4/2006 | Mitsumoto et al. | 382/154 |
| 2006/0126737 A1 * | 6/2006 | Boice et al. | 375/240.16 |
| 2008/0036867 A1 | 2/2008 | Lin et al. | |
| 2008/0049145 A1 | 2/2008 | Yokoyama et al. | |
| 2008/0219573 A1 * | 9/2008 | Lu | 382/236 |
| 2008/0291271 A1 | 11/2008 | Hansson et al. | |
| 2009/0245755 A1 | 10/2009 | Lee et al. | |
| 2014/0270484 A1 * | 9/2014 | Chandraker et al. | 382/154 |

* cited by examiner

*Primary Examiner* — Ishrat I Sherali
(74) *Attorney, Agent, or Firm* — Ella Cheong Hong Kong; Sam T. Yip (57) ABSTRACT

This invention discloses a method for object tracking, including determination of an area scaling ratio of the object in a video image sequence. In one embodiment, a centroid of the object is determined. One or more directed straight lines are selected, each passing through the centroid, extending from an end of the object's boundary to an opposite end thereof, and having a direction that is upward. A length scaling ratio for each directed straight line is determined by: determining a motion vector for each selected pixel on the line; computing a scalar component of the motion vector projected onto the line; estimating a change of the line's length according to the scalar components obtained for all pixels; and determining the length scaling ratio according to the change of the line's length. The area scaling ratio is computed based on the length scaling ratios for all directed straight lines.

12 Claims, 6 Drawing Sheets

SCALE CHANGING DETECTION AND SCALING RATIO DETERMINATION BY USING MOTION INFORMATION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to determining an area scaling ratio of an object in a video image sequence based on the motion information therein.

BACKGROUND

In video and image processing, the size of an object in a video image sequence is a key descriptor for the object. In addition, detection and estimation of a size change of the object is informative to many applications. The estimation of the size change leads to a scaling ratio of the object. For example, in a camera surveillance system, a size change of a person appeared on the video image captured by a camera indicates that the person comes closer or go away from the camera. A scaling ratio of the person appeared on the video frames captured on different times can be used to calculate the distance of the person from the camera. Knowing this distance enables tracking the person. There is a need to estimate the scale factor of an object in a video image sequence, preferably making use of motion information in the form of motion vectors commonly present in the video image sequence.

In US20030122853, US20080049145, U.S. Pat. No. 6,115,067, US20080036867 and US20080291271, a displacement calculated from a motion vector is used to detect if there is any movement of an object. However, a method to calculate the scale ratio is not given.

A method for evaluating a scale factor (i.e. a scale ratio) is disclosed in U.S. Pat. No. 6,549,683. The scale factor is determined by comparing a scaled image with a reference template. The need to construct a reference template, however, is typically not a simple task.

In US20090245755, blocking boundary artifact pixels are detected in the two decoded images to indicate the object boundaries it then computes a sum of pixel values for each blocking boundary artifact and the pixel distance between each pair or neighboring block boundaries. The scaling ratio is determined based on the distance value and the sum of pixel values. However, blocking boundary artifact does not always correspond to the actual object boundary. Besides, the application of this invention is limited to the decoded images only.

In US20060126737, a scaling ratio is calculated through measuring the displacements in the x-direction and in the y-direction independently based on the motion vectors. Although the scaling ratio of an object having a rectangular shape can be estimated with accuracy by the aforementioned approach, a high accuracy may not be achieved in case the object has an irregular shape.

There is a need in the art to have an improved, simple method for estimating the scaling ratio, particularly if the object has an irregular shape.

SUMMARY OF THE INVENTION

An aspect of the present invention is a method for tracking an object in a video image sequence. The method comprises: determining whether the object is substantially stationary; determining whether the object has a scale change if the object is determined to be not substantially stationary; and evaluating the area scaling ratio if the scale change of the object is determined to be present. Optionally, the method further comprises: assigning a value of 1 to the area scaling ratio if the object is determined to be substantially stationary; and assigning a value of 1 to the area scaling ratio if the scale change of the object is determined to be absent.

The determining of whether the object has a scale change may comprise generating a motion direction histogram, and may further comprise calculating a difference between the highest value and the second highest value in a set of probability-of-occurrences or number-of-occurrences values reported in the motion direction histogram. The motion direction histogram may be generated for the object alone or for the whole video scene.

Preferably, the evaluating of the area scaling ratio comprises: determining a centroid of the object; selecting one or more directed straight lines each of which passes through the centroid, extends from an end of the object's boundary to an opposite end thereof, and has a direction that is upward, whereby each of the directed straight lines is divided into an upper portion and a bottom portion by the centroid; determining a length scaling ratio for each of the directed straight lines; and computing the area scaling ratio based on the length scaling ratios determined for the directed straight lines. The determination of the length scaling ratio for a through-centroid line selected from the directed straight lines comprises the following steps. A motion vector for each of selected pixels on the through-centroid line is determined. The selected pixels on the through-centroid line may comprise all pixels, or a subset of all pixels, on the through-centroid line. For each of the selected pixels on the through-centroid line, a scalar component of the motion vector projected onto the through-centroid line with reference to the direction thereof is computed. A length of the through-centroid line is determined. A change of the through-centroid line's length is computed according to a first mean and a second mean, where the first mean is an average value of the scalar components over the selected pixels on the upper portion of the through-centroid line, and the second mean is an average value of the scalar components over the selected pixels on the bottom portion of the through-centroid line. The length scaling ratio is estimated according to the length of the through-centroid line and the change of the through-centroid line's length.

Various formulas for computing the change of the through-centroid line's length, the length scaling ratio and the area scaling ratio are provided in the present invention and elaborated in the specification.

DETAILED DESCRIPTION

As used herein, "a scaling ratio" is referred to as a ratio of the area of an object in a first frame to the object's area in a second frame. Furthermore, "an area scaling ratio" is used herein as a synonym to refer to "a scaling ratio." A "length scaling ratio," occasionally used herein, is referred to as a ratio of a length of an object in a first frame to the object's length in a second frame, and is therefore not equivalent to "a scaling ratio" as defined herein.

An aspect of the present invention is a method for tracking an object in a video image sequence. An embodiment of this method is illustrated with an aid from FIG. 1, which depicts a flowchart of this method.

Figure 1:
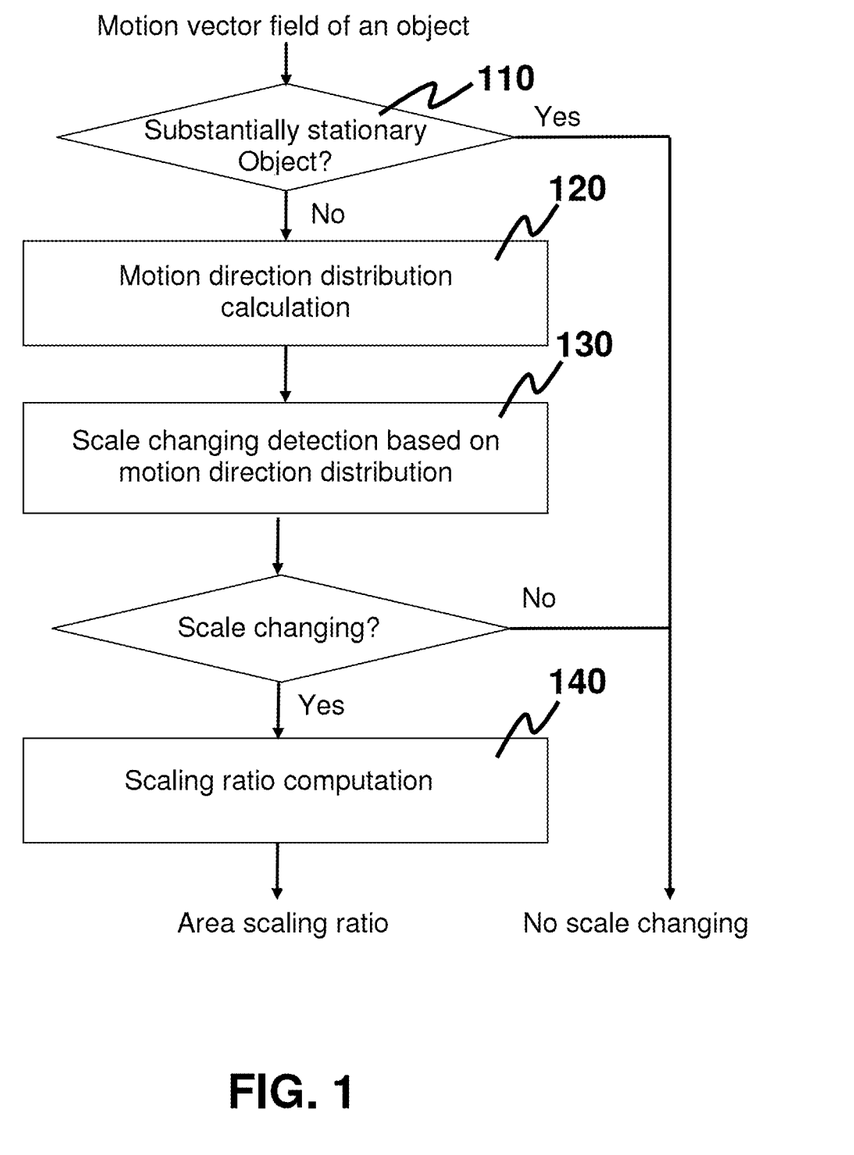
FIG. 1 depicts a flowchart of tracking an object in a video image sequence according to an embodiment of the present invention.

In the disclosed method, whether the object is substantially stationary is determined in a first step 110. In one embodiment, this determination is done by calculating the number of non-motion pixels within the object, and checking the number of non-motion pixels against a threshold. The object is determined to be substantially stationary if this number exceeds the threshold. In case the object is determined to be substantially stationary, a value of 1 may optionally be assigned to the area scaling ratio. Otherwise, the area scaling ratio is evaluated. If the object is determined not to be substantially stationary, a second step 120 of generating a motion direction distribution is carried out. The motion direction distribution is an angular distribution of the movement directions of the pixels within the moving objects in a video scene by first identifying displacement of correlated pixels in two video frames and then evaluating angles of movement. Based on the results of the motion direction distribution, a presence or an absence of scale changing is detected in a third step 130. For example, when the object only moves in a horizontal direction or in a vertical direction, i.e. when the object does not move towards the screen in displaying the video image sequence, scale changing of the object is absent. If, on the other hand, the object moves toward or away from the display screen, there is scale changing of the object. In case scale changing of the object is absent, a value of 1 may optionally be assigned to the area scaling ratio. If there is scale changing, it implies a change of the object's size, and the area scaling ratio is calculated in a fourth step 140.

Figure 2A:
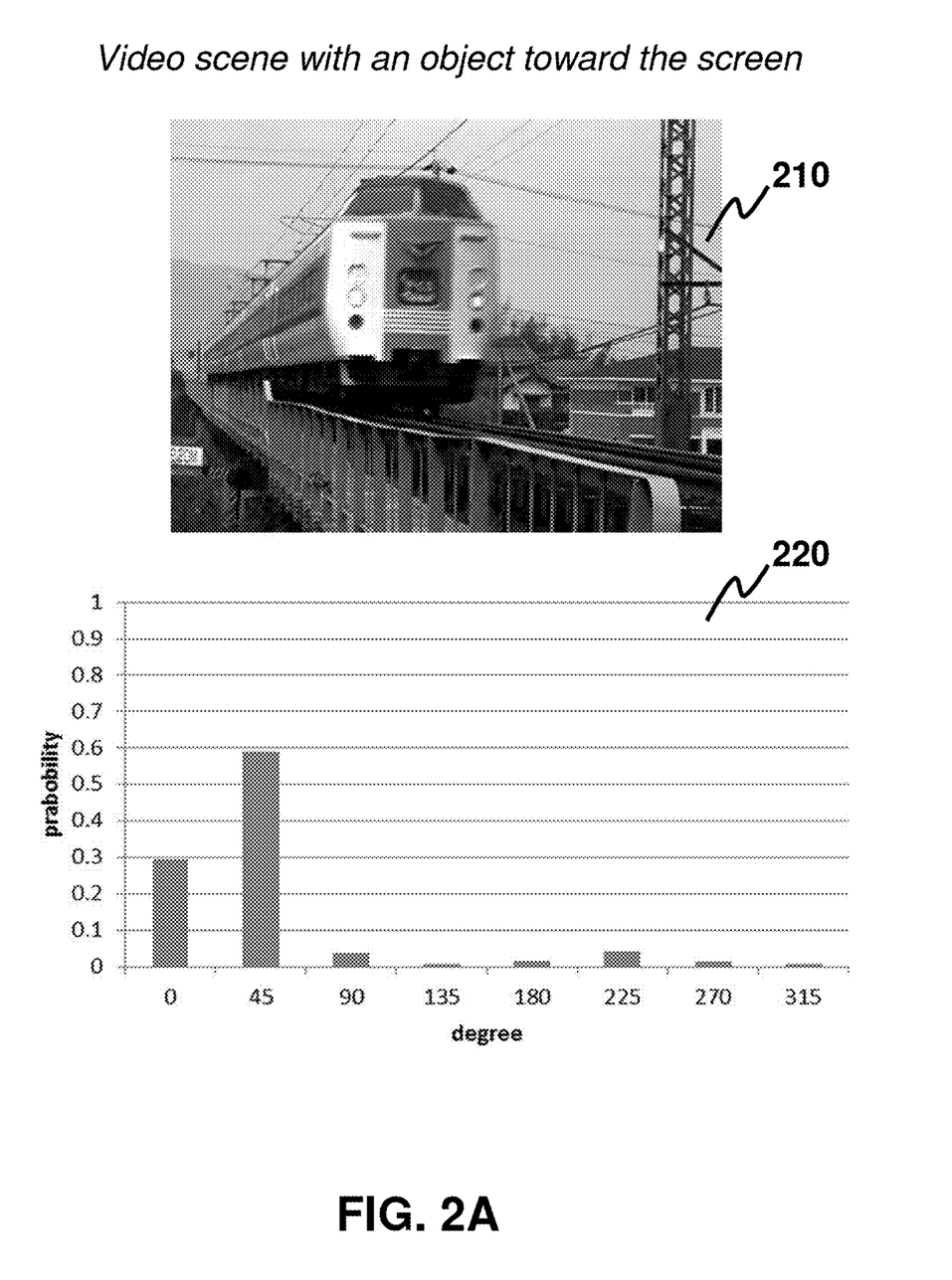
FIG. 2a shows a first example of a motion direction histogram, generated for a video scene with an object moving toward a screen.
Figure 2B:
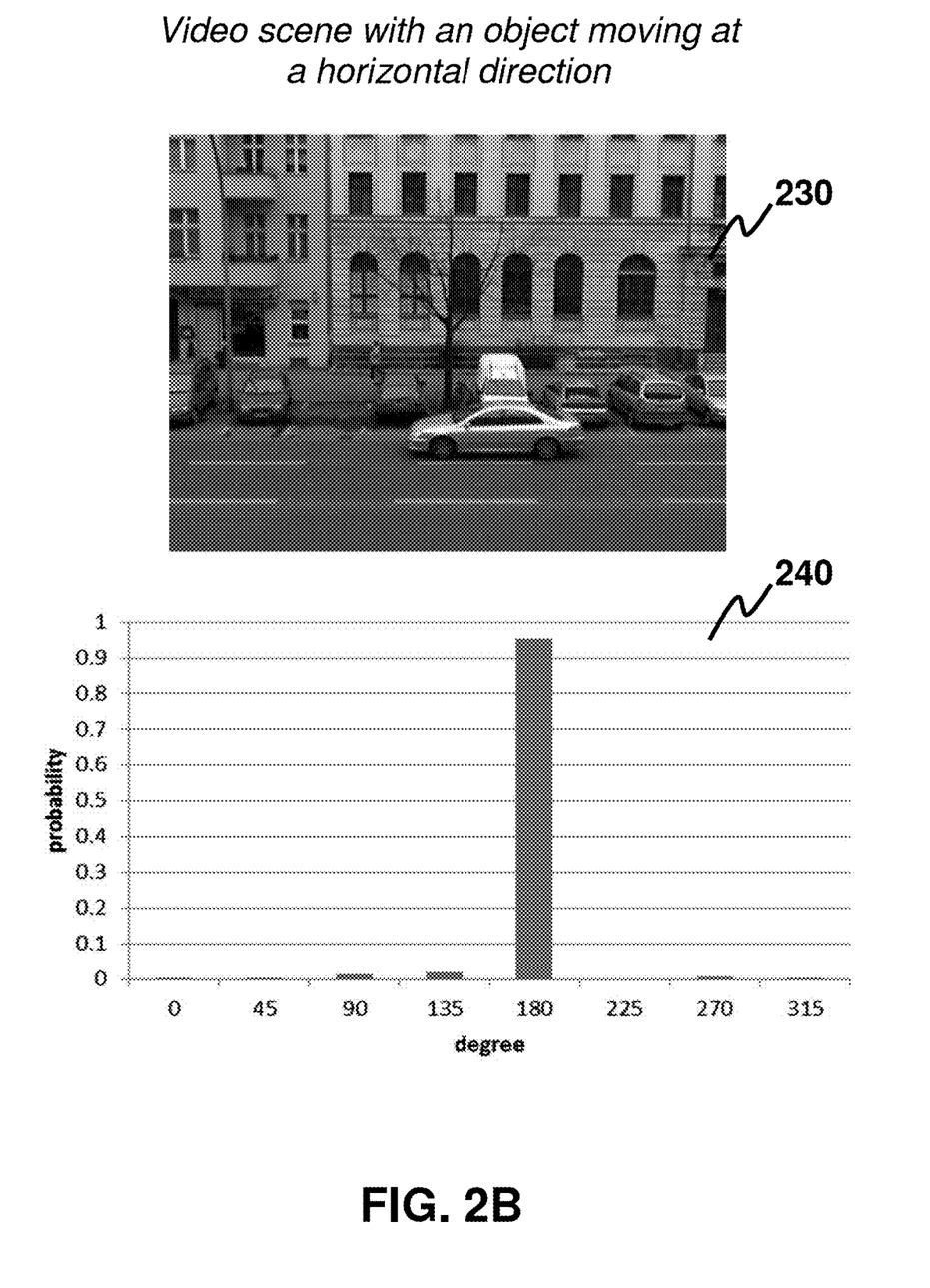
FIG. 2b shows a second example of a motion direction histogram, generated for a video scene with an object moving in a horizontal direction.

Preferably, generating the motion direction distribution comprises generating a motion direction histogram. The motion direction histogram may be generated for the object alone or for the whole video scene. FIG. 2a shows a first example of the motion direction histogram, where an object (a train) 210 in a video scene moves towards the screen. In FIG. 2b, a second example of the motion direction histogram for another object (a car) 230 that moves in a horizontal direction is shown. Notice that a scale change does not occur for the car in FIG. 2b but a scale change happens for the train in FIG. 2a. From the motion direction histogram 240 in FIG. 2b, there is a single peak in the y-axis value (probability of occurrences, or number of occurrences, or their equivalents). On the other hand, there are more than one peak in the motion direction histogram 220 shown in FIG. 2a. In one embodiment, generating the motion direction distribution further comprises calculating a difference between the highest value and the second highest value in a set of probability-of-occurrences or number-of-occurrences values reported in the motion direction histogram. In case the difference exceeds a certain threshold value, it may be determined that the scale change is absent.

Figure 3:
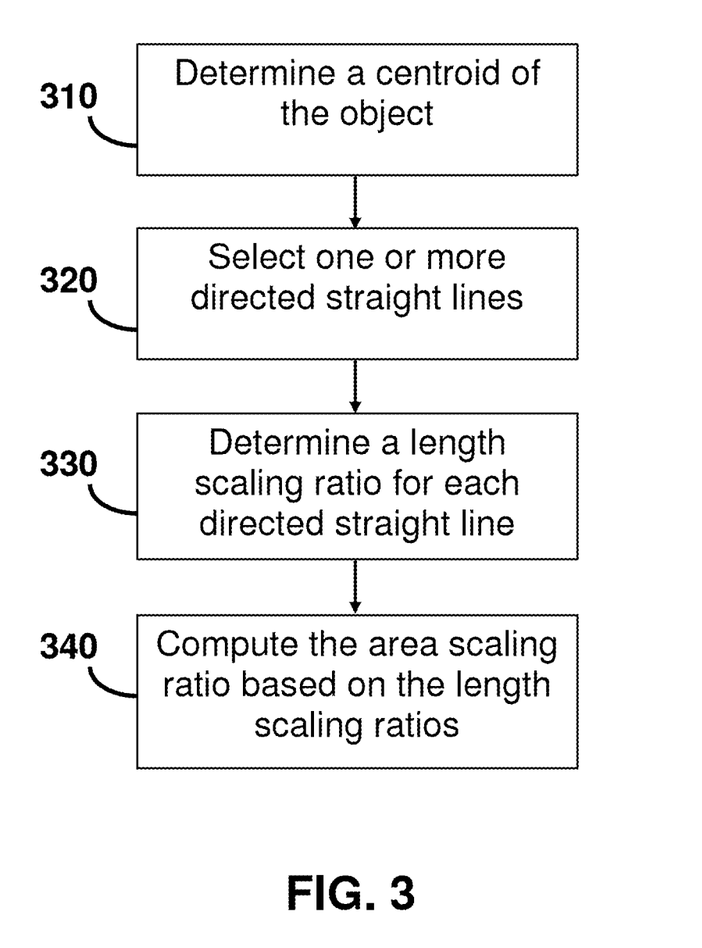
FIG. 3 depicts a flowchart illustrating, in accordance with an embodiment of the present invention, the steps of evaluating the area scaling ratio if the object is determined to be not substantially stationary.
Figure 4:
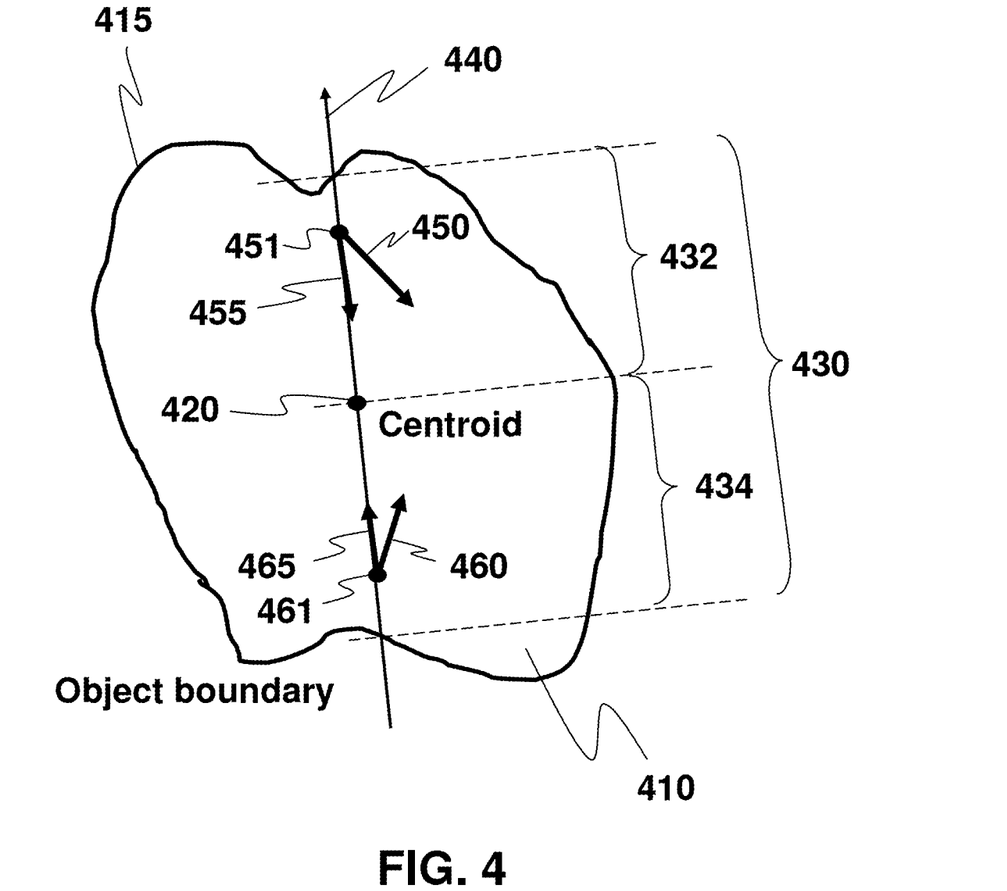
FIG. 4 depicts an object, its centroid, and a through-centroid line onto which motion vectors are projected, such that a change of the through-centroid line's length can be estimated.

If the scale change is determined to be present, an exemplary embodiment for calculating the area scaling ratio is illustrated as follows with an aid of FIG. 3, which is a flowchart showing the steps of this calculation, and of FIG. 4, which is the object for which the area scaling ratio is calculated. In a first step 310, a centroid 420 of an object 410 is determined. The centroid 420 can be determined by a standard mathematical technique known in the art. In a second step 320, one or more directed straight lines 430 are selected. Each directed straight line 430 passes through the centroid 420, extends from an end of the object's boundary 415 to an opposite end thereof, and has a direction 440 that is upward. Since each directed straight line 430 passes through the centroid 420, the line 430 is divided into an upper portion 432 and a bottom portion 434 by the centroid 420. Generally, using a higher number of directed straight lines 430 increases the accuracy in the estimation of the area scaling ratio. In particular, the increased accuracy by using a higher number of directed straight lines 430 is substantial if the shape of the object is irregular. In a third step 330, a length scaling ratio for each directed straight line 430 is determined. As mentioned above, the length scaling ratio is a ratio of the length of the directed straight line 430 in a first frame to that in a second frame. In a fourth step 340, based on the length scaling ratios determined for all the directed straight lines 430 selected in the second step 320, the area scaling ratio can be computed.

Figure 5:
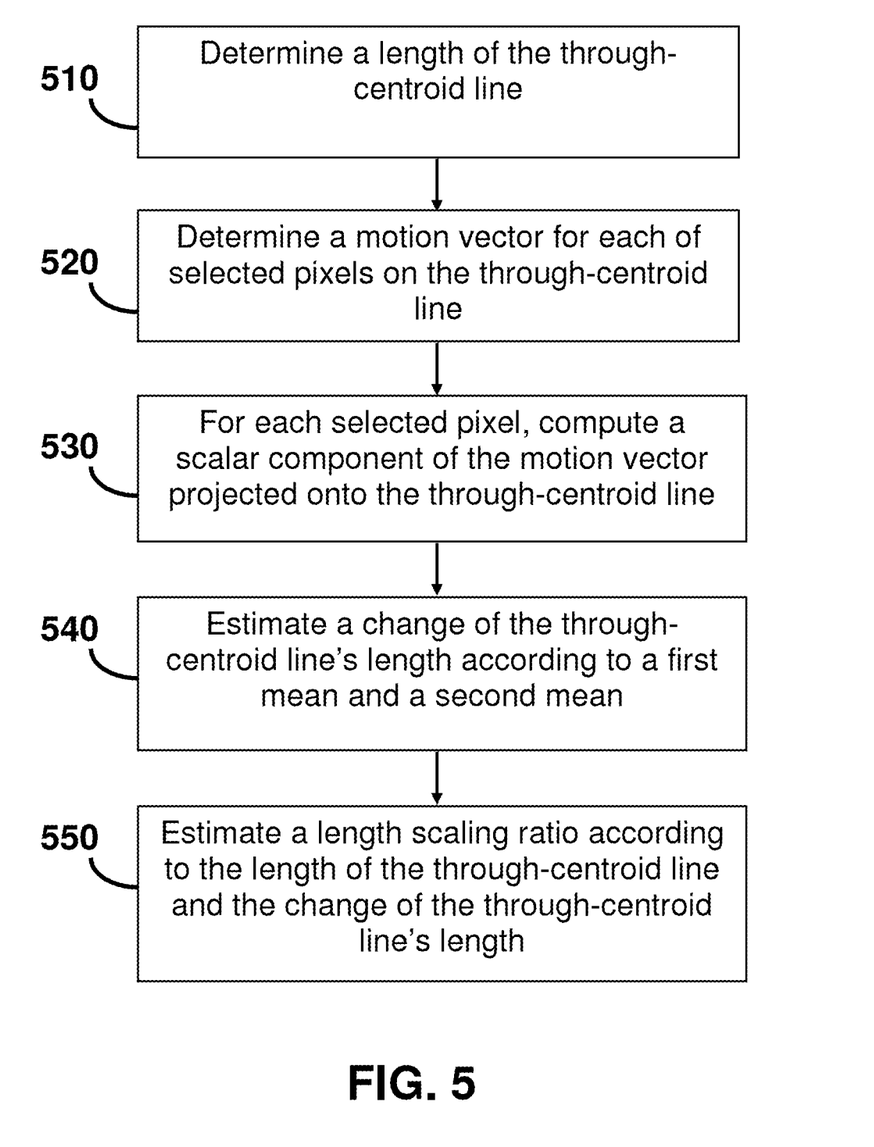
FIG. 5 depicts a flowchart illustrating, in accordance with an embodiment of the present invention, the steps of determining a length scaling ratio for a through-centroid line, thereby enabling computation of the area scaling ratio.

Since any one directed straight line passes through the centroid 420, the directed straight line 430 is a through-centroid line. Determining the line scaling ratio for a through-centroid line selected from the directed straight lines 430 is illustrated as follows with an aid from FIG. 5, which shows a flowchart for this determination, and also from FIG. 4. In a first step 510, a length of the through-centroid line 430 is determined. Nonetheless, this first step 510 may be done any time before evaluating the length scaling ratio in a later step 550. A motion vector for each of selected pixels on the through-centroid line 430 is determined in a second step 520. Optionally, the selected pixels on the through-centroid line 430 may comprise all pixels thereon. Alternatively, the selected pixels may comprise a subset of all pixels on the through-centroid line 430. Using the subset of all pixels enables a block-based implementation of the disclosed method. For illustration, a selected pixel 451 on the upper portion 432 of the through-centroid line 430 has a motion vector 450 while another selected pixel 461 on the bottom portion 434 has a corresponding motion vector 460. For each of the selected pixels on the through-centroid line, a scalar component of the motion vector projected onto the through-centroid line with reference to the direction thereof is computed in a third step 530. It follows that the motion vector 450 determined for the selected pixel 451 has a scalar component 455. Note that the scalar component 455 has a negative value since, as depicted in FIG. 4, this scalar component 455 is in a direction opposite to the direction 440 of the through-centroid line 430. Similarly, the motion vector 460 determined for the selected pixel 461 has a scalar component 465. In a fourth step 540, a change of the length of the through-centroid line 430 is estimated according to a first mean and a second mean, where the first mean is an average value of the scalar components over the selected pixels on the upper portion 432 of the through-centroid line 430, and the second mean is an average value of the scalar components over the selected pixels on the bottom portion 434 of the through-centroid line 430. In a fifth step 550, the length scaling ratio is estimated according to the length of the through-centroid line 430 and the change of the length of the through-centroid line 430.

Preferably, evaluation of the area scaling ratio includes the following computations. Without loss of generality, consider that the kth directed straight line is chosen as the through-centroid line 430. Let M be the number of selected pixels on the upper portion 432 of the kth directed straight line, and let N be the number of selected pixels on the bottom portion 434 thereof. Let $V_{k,m}^u$ denote the motion vector determined for the mth selected pixel on the upper portion 432 of the kth directed straight line. Similarly, let $V_{k,m}^b$ denote the motion vector determined for the nth selected pixel on the bottom portion 434 of the kth directed straight line. Projecting the motion vectors $V_{k,m}^u$ and $V_{k,n}^b$ onto the kth directed straight line yields the scalar components $\hat{V}_{k,m}^u$ and $\hat{V}_{k,n}^b$ respectively. Let $L^k$ be the length of the kth directed straight line. Also let $\Delta L^k$ be the change of the kth directed straight line's length computed according to the motion vectors. Preferably, $\Delta L^k$ is computed by $$\Delta L^k = 2 \times \left[ \frac{1}{M} \sum_{m=1}^{M} \hat{V}_{k,m}^u - \frac{1}{N} \sum_{n=1}^{N} \hat{V}_{k,n}^b \right]. \quad \text{(EQN. 1)}$$

Note that the computation of $\Delta L^k$ by EQN. (1) does not involve $L^k$. It is also preferable that the length scaling ratio of the kth directed straight line is estimated as $R^k$ by $$R^k = \frac{L^k}{L^k + \Delta L^k}. \quad \text{(EQN. 2)}$$

Let K be the number of all the directed straight lines that are selected. Preferably, the area scaling ratio is computed as S by $$S = \left( \frac{1}{K} \sum_{k=1}^{K} R^k \right)^2. \quad \text{(EQN. 3)}$$

Embodiments of the present invention may be implemented in the form of software, hardware, application logic or a combination of software, hardware and application logic. The software, application logic and/or hardware may reside on integrated circuit chips, modules or memories. If desired, part of the software, hardware and/or application logic may reside on integrated circuit chips, part of the software, hardware and/or application logic may reside on modules, and part of the software, hardware and/or application logic may reside on memories. In one exemplary embodiment, the application logic, software or an instruction set is maintained on any one of various conventional non-transitory computer-readable media.

Processes and logic flows which are described in this specification can be performed by one or more programmable processors executing one or more computer programs to perform functions by operating on input data and generating output. Processes and logic flows can also be performed by special purpose logic circuitry, e.g., an FPGA (field programmable gate array) or an ASIC (application-specific integrated circuit).

Apparatus or devices which are described in this specification can be implemented by a programmable processor, a computer, a system on a chip, or combinations of them, by operating on input date and generating output. Apparatus or devices can include special purpose logic circuitry, e.g., an FPGA (field programmable gate array) or an ASIC (application-specific integrated circuit). Apparatus or devices can also include, in addition to hardware, code that creates an execution environment for computer program, e.g., code that constitutes processor firmware, a protocol stack, a database management system, an operating system, a cross-platform runtime environment, e.g., a virtual machine, or a combination of one or more of them.

Processors suitable for the execution of a computer program include, for example, both general and special purpose microprocessors, and any one or more processors of any kind of digital computer. Generally, a processor will receive instructions and data from a read-only memory or a random access memory or both. The elements of a computer generally include a processor for performing or executing instructions, and one or more memory devices for storing instructions and data.

Computer-readable medium as described in this specification may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. Computer-readable media may include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

A computer program (also known as, e.g., a program, software, software application, script, or code) can be written in any programming language, including compiled or interpreted languages, declarative or procedural languages, and it can be deployed in any form, including as a stand-alone program or as a module, component, subroutine, object, or other unit suitable for use in a computing environment. A computer program can be deployed to be executed on one computer or on multiple computers that are located at one single site or distributed across multiple sites and interconnected by a communication network.

Embodiments and/or features as described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with one embodiment as described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The whole specification contains many specific implementation details. These specific implementation details are not meant to be construed as limitations on the scope of the invention or of what may be claimed, but rather as descriptions of features specific to particular embodiments of the invention.

Certain features that are described in the context of separate embodiments can also be combined and implemented as a single embodiment. Conversely, various features that are described in the context of a single embodiment can also be implemented in multiple embodiments separately or in any suitable subcombinations. Moreover, although features may be described as acting in certain combinations and even initially claimed as such, one or more features from a combination as described or a claimed combination can in certain cases be excluded from the combination, and the claimed combination may be directed to a subcombination or variation of a subcombination. Although various aspects of the invention are set out in the independent claims, other aspects of the invention comprise other combinations of features from the embodiments and/or from the dependent claims with the features of the independent claims, and not solely the combinations explicitly set out in the claims.

Certain functions which are described in this specification may be performed in a different order and/or concurrently with each other. Furthermore, if desired, one or more of the above-described functions may be optional or may be combined.

The above descriptions provide exemplary embodiments of the present invention, but should not be viewed in a limiting sense. Rather, it is possible to make variations and modifications without departing from the scope of the present invention as defined in the appended claims.

What is claimed is:

1. A method for tracking an object in a video image sequence by one or more processors, comprising evaluating an area scaling ratio of the object, wherein the evaluating of the area scaling ratio comprises:
    determining a centroid of the object;
    selecting one or more directed straight lines each of which passes through the centroid, extends from an end of the object's boundary to an opposite end thereof, and has a direction that is upward, whereby each of the directed straight lines is divided into an upper portion and a bottom portion by the centroid;
    determining a length scaling ratio for each of the directed straight lines; and
    computing the area scaling ratio based on the length scaling ratios determined for the directed straight lines;
    the determining of the length scaling ratio for a through-centroid line selected from the directed straight lines comprising:
    determining a motion vector for each of selected pixels on the through-centroid line;
    computing, for each of the selected pixels on the through-centroid line, a scalar component of the motion vector projected onto the through-centroid line with reference to the direction thereof;
    determining a length of the through-centroid line;
    estimating a change of the through-centroid line's length according to a first mean and a second mean, the first mean being an average value of the scalar components over the selected pixels on the upper portion of the through-centroid line, the second mean being an average value of the scalar components over the selected pixels on the bottom portion of the through-centroid line; and
    estimating the length scaling ratio according to the length of the through-centroid line and the change of the through-centroid line's length.

2. The method of claim 1, further comprising:
    determining whether the object is stationary;
    determining whether the object has a scale change if the object is determined to be not stationary; and
    executing the evaluating of the area scaling ratio if the scale change of the object is determined to be present.

3. The method of claim 2, wherein the determining of whether the object has the scale change comprises generating a motion direction histogram.

4. The method of claim 3, wherein the determining of whether the object has the scale change further comprises calculating a difference between the highest value and the second highest value in a set of probability-of-occurrences or number-of-occurrences values reported in the motion direction histogram.

5. The method of claim 1, wherein the change of the through-centroid line's length is estimated as $\Delta L^k$ by $$\Delta L^k = 2 \times \left[ \frac{1}{M} \sum_{m=1}^{M} \hat{V}_{k,m}^{u} - \frac{1}{N} \sum_{n=1}^{N} \hat{V}_{k,n}^{b} \right]$$

where:
    the k th directed straight line is selected as the through-centroid line;
    M is the number of the selected pixels on the upper portion of the k th directed straight line;
    N is the number of the selected pixels on the bottom portion of the k th directed straight line;
    $\hat{V}_{k,m}^{u}$ is the scalar component of $V_{k,m}^{u}$ projected onto of the k th directed straight line, $V_{k,m}^{u}$ being the motion vector determined for the m th selected pixel on the upper portion of the k th directed straight line; and
    $\hat{V}_{k,n}^{b}$ is the scalar component of $V_{k,n}^{b}$ projected onto of the k th directed straight line, $V_{k,n}^{b}$ being the motion vector determined for the n th selected pixel on the bottom portion of the k th directed straight line.

6. The method of claim 5, wherein the length scaling ratio of the through-centroid line is estimated as $R^k$ by $$R^k = \frac{L^k}{L^k + \Delta L^k}$$

where $L^k$ is the length of the k th directed straight line.

7. The method of claim 6, wherein the area scaling ratio is computed as S by $$S = \left( \frac{1}{K} \sum_{k=1}^{K} R^k \right)^2$$

where K is the number of all the directed straight lines.

8. The method of claim 1, wherein the selected pixels on the through-centroid line comprise all pixels, or a subset thereof, on the through-centroid line.

9. A method for tracking an object in a video image sequence by one or more processors, comprising determining whether the object has a scale change, wherein the determining of whether the object has the scale change comprises:
  generating a motion direction histogram; and
  calculating a difference between the highest value and the second highest value in a set of probability-of-occurrences or number-of-occurrences values reported in the motion direction histogram.

10. The method of claim 9, further comprising:
determining whether the object is stationary; and
executing the determining of whether the object has the scale change if the object is determined to be not stationary.

11. The method of claim 10, further comprising:
assigning a value of 1 to an area scaling ratio if the object is determined to be stationary; and
assigning a value of 1 to the area scaling ratio if the scale change of the object is determined to be absent.

12. The method of claim 10, further comprising:
evaluating an area scaling ratio of the object in the video sequence if the scale change of the object is determined to be present.

\* \* \* \* \*